Figure 15:
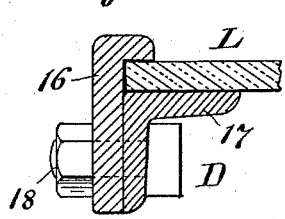

(No Model.) 4 Sheets—Sheet 1.
C. B. JEFFERSON.
STAGE AND SCENIC EFFECT FOR DRAMATIC REPRESENTATIONS, &c.
No. 465,044. Patented Dec. 15, 1891.
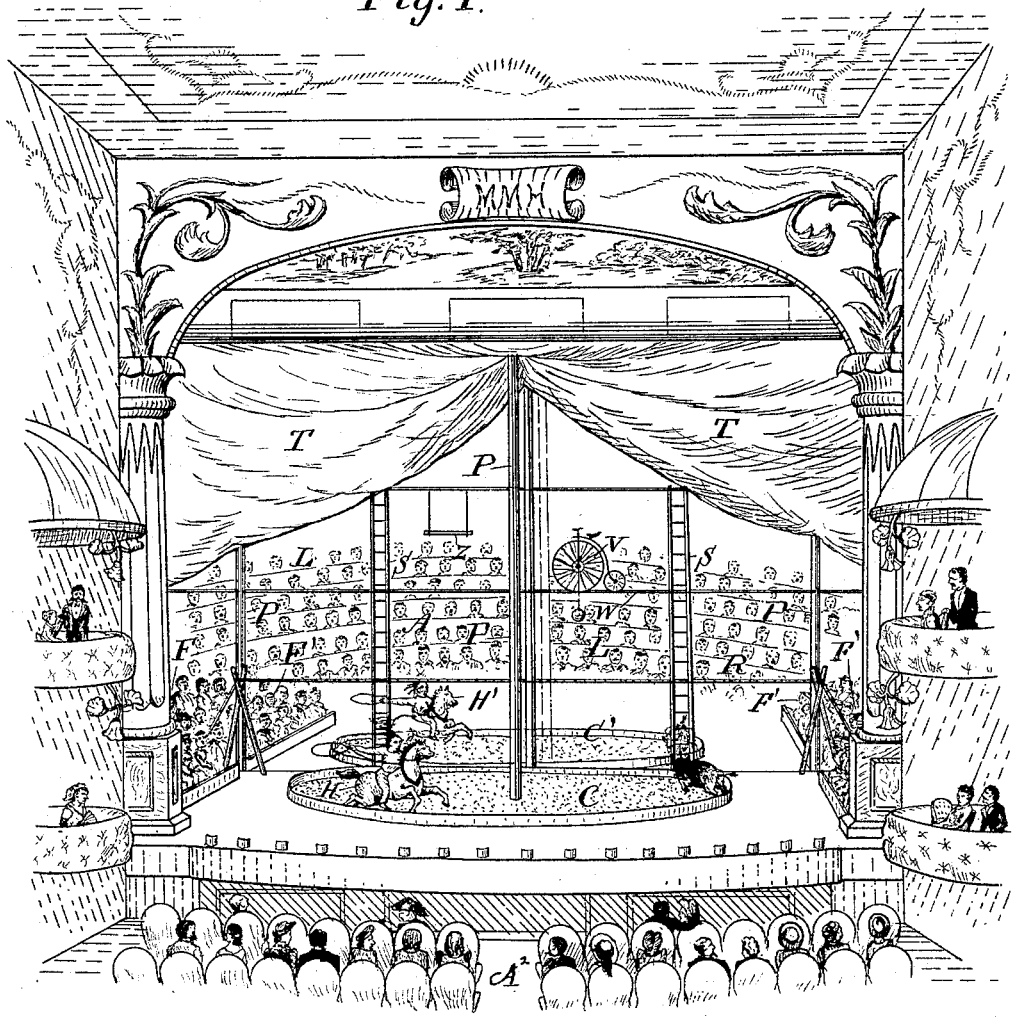

(No Model.) 4 Sheets—Sheet 2.
C. B. JEFFERSON.
STAGE AND SCENIC EFFECT FOR DRAMATIC REPRESENTATIONS, &c.
No. 465,044. Patented Dec. 15, 1891.
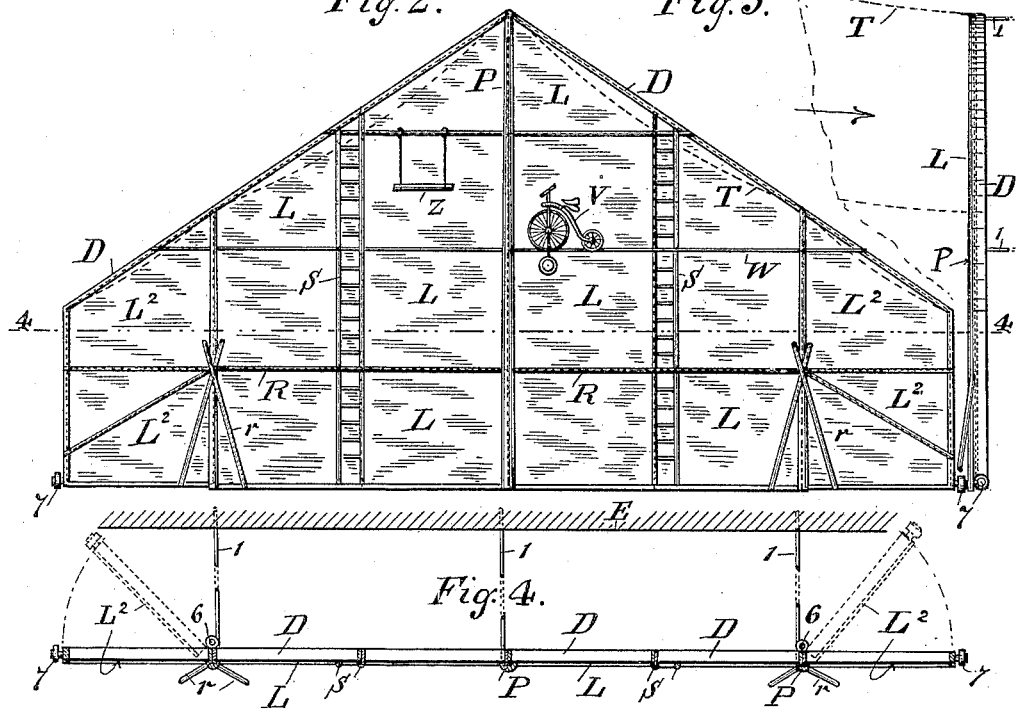
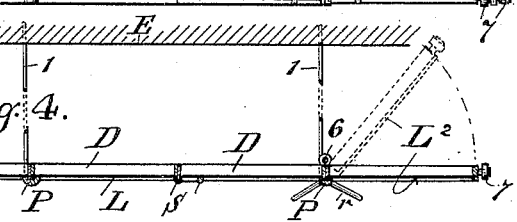
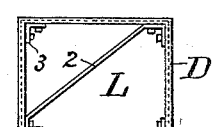
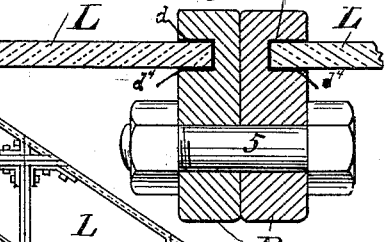
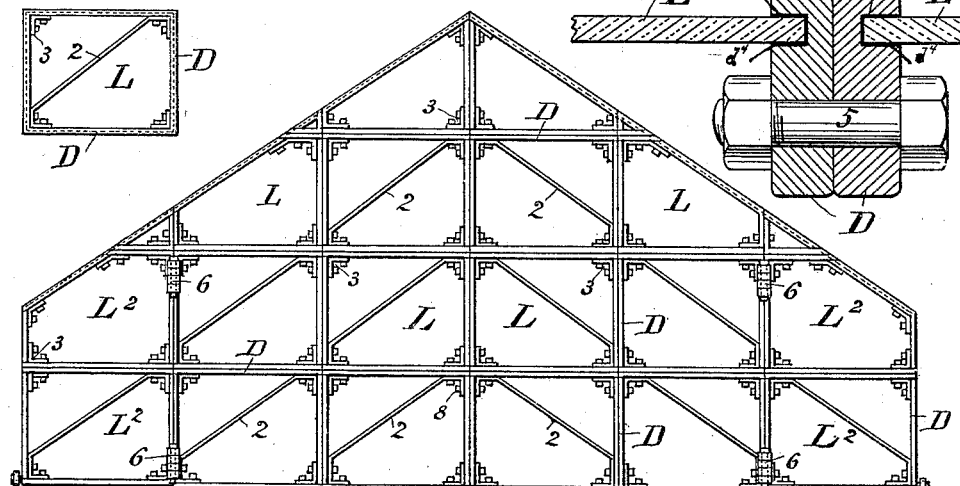
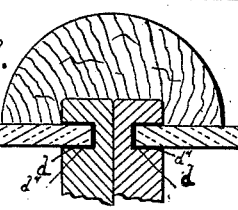
WITNESSES: INVENTOR
Chas. Hanemann Charles B. Jefferson
Cecil Nowah BY Mitchell L. Erlanger
ATTORNEY.
THE NORRIS PETERS CO., PHOTO-LITHO., WASHINGTON, D. C.

(No Model.) 4 Sheets—Sheet 3.
C. B. JEFFERSON.
STAGE AND SCENIC EFFECT FOR DRAMATIC REPRESENTATIONS, &c.
No. 465,044. Patented Dec. 15, 1891.
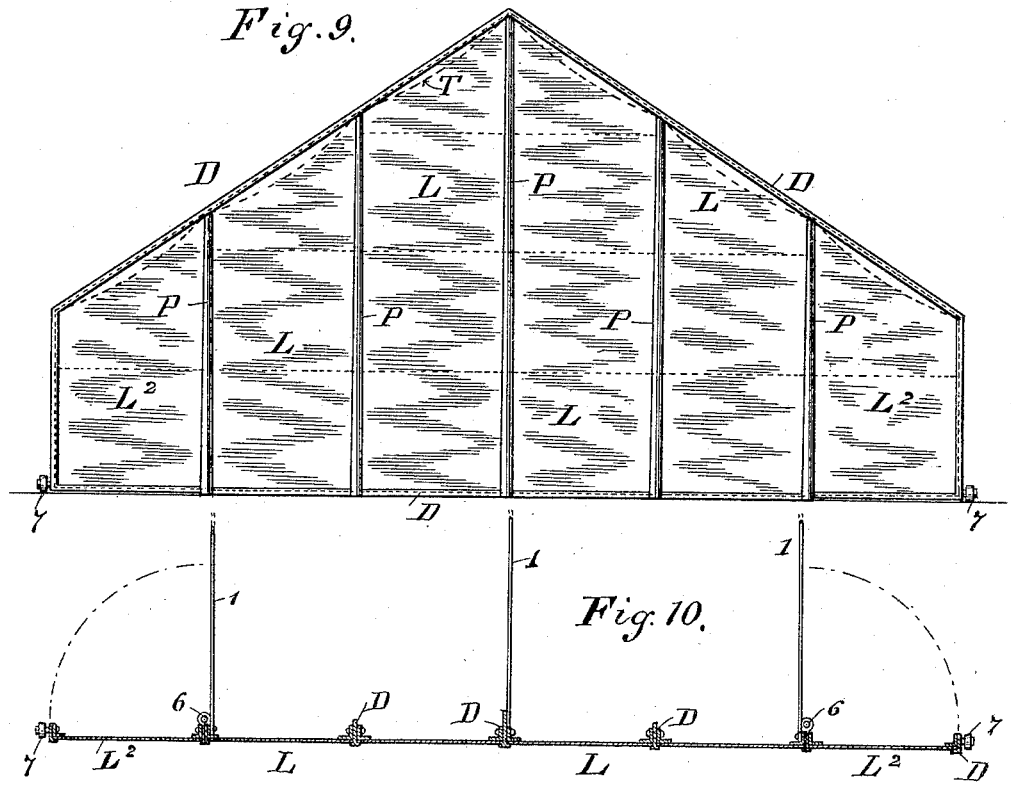
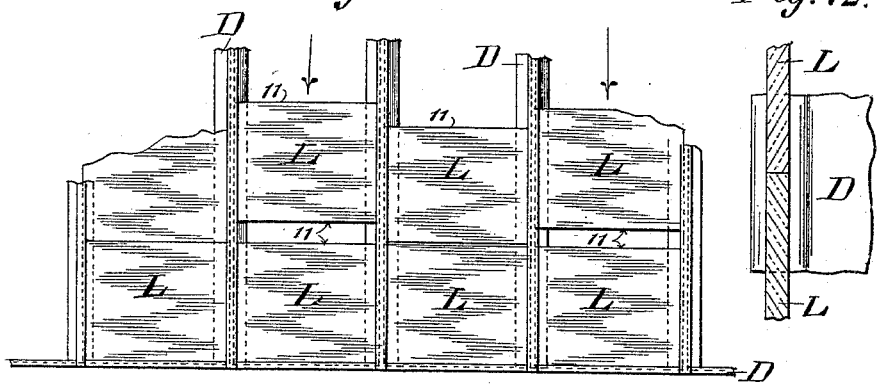
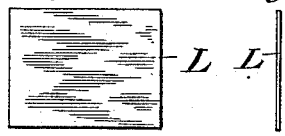
WITNESSES:
Chas. Hanimann
Lionel J. Noah
INVENTOR
Charles B. Jefferson
BY Mitchell L. Erlanger
ATTORNEY.

(No Model.) 4 Sheets—Sheet 4.

C. B. JEFFERSON.
STAGE AND SCENIC EFFECT FOR DRAMATIC REPRESENTATIONS, &c.

No. 465,044. Patented Dec. 15, 1891.

WITNESSES:
Chas Hanmann
Leonel J. Koale

INVENTOR
Charles B. Jefferson
BY Mitchell L. Erlanger
ATTORNEY.

UNITED STATES PATENT OFFICE.

CHARLES B. JEFFERSON, OF NEW YORK, N. Y., ASSIGNOR OF ONE-HALF TO MARC KLAW AND ABRAHAM L. ERLANGER, OF SAME PLACE.

STAGE AND SCENIC EFFECT FOR DRAMATIC REPRESENTATIONS, &c.

SPECIFICATION forming part of Letters Patent No. 465,044, dated December 15, 1891.

Application filed April 23, 1891. Serial No. 390,118. (No model.)

*To all whom it may concern:*

Be it known that I, CHARLES B. JEFFERSON, a citizen of the United States, residing in the city, county, and State of New York, have invented certain new and useful Improvements in Stage and Scenic Effects for Dramatic and other Representations, which are particularly adapted to producing illusory or deceptive effects especially valuable in stage performances and productions, of which the following is a specification, reference being had to the accompanying drawings, which form part of the same.

My invention consists in constructing a wall back of the stage—that is to say, a wall toward which the audience faces—of reflecting-mirrors, so that all that goes on upon the stage, the scenery, and the audience itself will be reflected visibly to the audience. Thereby an illusion of vast depth to the audience-room, great multitudes of people present, great numbers of performers on the stage, and other similar illusions will be produced, and the discovery of the deception will effect a highly humorous impression. The wall of mirrors may either be a permanent wall and part of the structure of the building, or, as will be most convenient, it may be a temporary construction erected and removed with the rest of the scenery. To produce the complete illusion which I contemplate, it is necessary that the frames which support the mirrors and the joints of the frames and mirrors should be disguised or concealed from view of the audience. I effect this by placing various appropriate scenic objects as circus-poles, tight ropes, performing-ladders, &c., immediately in front of the said frames and joints. These scenic objects, on the one hand, hide the said frames and joints, and on the other hand heighten the illusion. Since the invention is also adapted to stage representations of circus performances, wherein it is necessary to bring on large animals, I fashion the extreme end sections of the wall of mirrors, which are at the wings, on hinges, so that said end sections can be rolled and turned back and leave wide passages to the stage. These end sections will be hid from the view of all or nearly all the audience by the sides of the proscenium-arch. I also place lay or dummy figures near the wings, which will be reflected to the audience, and the effect of these lay figures may be heightened by coloring and painting the front and back of such lay figures diversely.

My invention further relates to the details of the construction of the frames and mirrors.

Figure 16:
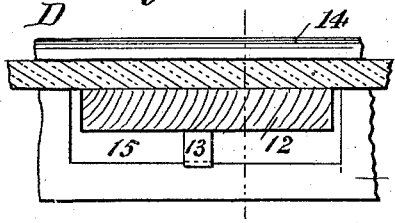
Figure 17:
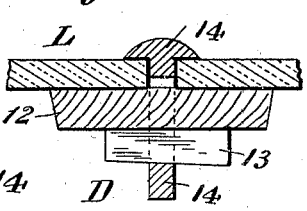
Figure 18:
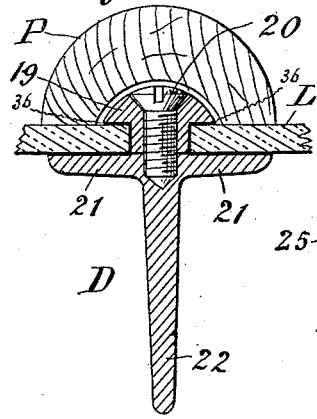
Figure 19:
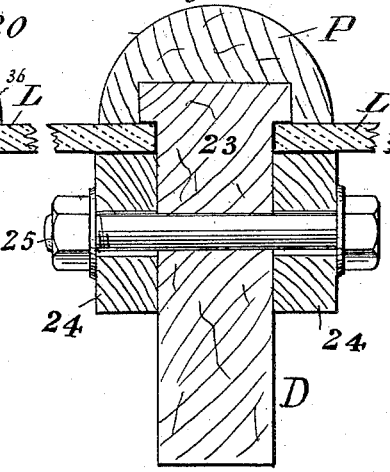
Figure 20:
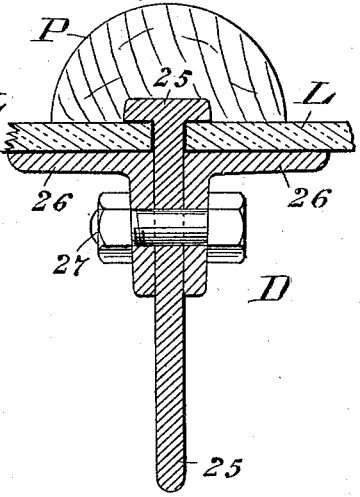
Figure 21:
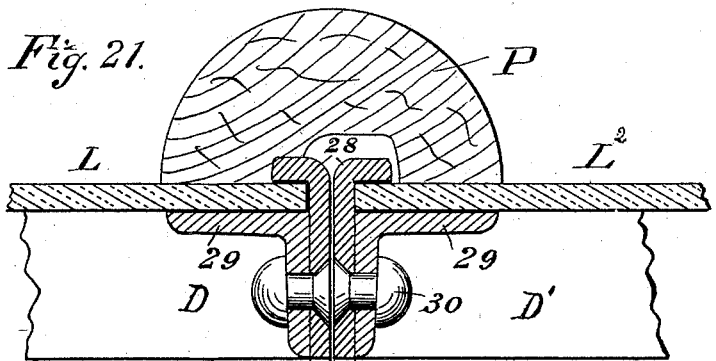

Referring now to the drawings which accompany the specification to aid in the description, Figure 1 is a pictorial representation of the interior of a house of amusement, looking toward the stage. This view represents the complete effect which will be presented by my stage. Fig. 2 is a front elevation of the wall of mirrors in a circus scene and showing the various tight ropes, poles, and other scenic objects disposed to conceal the joints and frames of the structure. Fig. 3 is an end or edge elevation of the wall of mirrors as seen from one side. Fig. 4 is a plan view from above, taken on the line 4 4 of Fig. 2 and indicating the manner of supporting the wall of mirrors. The hinges of the extreme end sections are also indicated. Fig. 5 is a detail of a single section of the framing of the wall of mirrors. Fig. 6 is an elevation of the framing of a complete wall of mirrors adapted to circus representations. Fig. 7 is an enlarged detail of a part of two adjoining sections of the framing, showing how the frames are fastened together and how the mirrors are held in the frames. Fig. 8 is a detail showing parts of two adjoining sections of framing and mirrors and circus-pole to conceal the frames. Fig. 9 is an elevation of a wall of mirrors formed with upright or vertical standards, but without horizontal frames. Fig. 10 is a plan view from above of the walls of mirrors represented in Fig. 9. Fig. 11 is an enlarged broken elevation seen from behind to show the mode of securing the mirrors in the standards. Fig. 12 is a detail on a plane perpendicular to the plane of Fig. 11, showing the frames and mirrors. Figs. 13 and 14 are an elevation and an edge view, respectively, of a single section or plate of mirror-glass. Fig. 15 is a detail of framing at the extreme ends of the mirror-wall. Figs. 16 and 17 are plan and section, respectively, of a device for quickly and easily securing the sections of mirror in the frames. Figs. 18, 19, and 20 are details of three several shapes and arrangements of frames, and each view showing sections of mirror and circus-poles for concealing the ends of the frames. Fig. 21 is a detail of one of the hinges of the wall of mirrors by means of which the end sections can be turned back.

The general principle and plan: In general my invention consists in the application to an audience-room and stage, for scenic purposes, of a wall of mirrors A, Fig. 1, which wall A is erected at the back of the stage A', so that any representation C which is being given on the said stage will be reflected visibly to the audience $A^2$. Thus a duplicate effect will be produced. For example, in a representation like that shown in Fig. 1 the audience will behold two circus-rings, one C on the stage, the other (its reflection) C' some distance behind. At the same time the audience will behold itself reflected as a second audience in the far depths of the mirror, whereby will be produced an illusion of vast size of audience-room and great numbers of people in the audience and of double representations going on upon the stage A' simultaneously. To heighten the illusion and prevent the immediate detection of the mirrors, I place various appropriate scenic objects immediately in front of the frames which support the mirrors and in front of the joints of the mirrors. Thus in Fig. 1 poles P P, fashioned to resemble tent-poles and apparently sustaining a tent T T, and the performing-ladders S S are placed immediately in front of the perpendicular frames of the wall of mirrors A, and tight ropes R W are stretched immediately in front of the horizontal joints of the frames and mirrors. These poles P P may well be secured upon the frames in the manner represented in the various details, Figs. 8, 18, 19, and 20, where the poles P P have rabbets in their back sides, which fit over the ends of the frames D, and said poles P P might be bolted to said frames D. The tight ropes R W may also be secured to the horizontal frames to prevent said tight ropes from sagging and revealing the joints of the mirrors and frames. Any other appropriate objects may be arranged in front of the mirrors, as V Z in Fig. 1, and I greatly heighten the effect by placing lay figures F' F' near the wings at either side of the stage. These lay figures F' F' will be nearly or quite out of sight of the audience, and only their reflection in the mirrors will be observed by the audience. The fronts and backs of said lay images may be differently colored and painted, as on one side a white man, on the other side a negro, and said lay figures may be easily placed so that both sides will be reflected in the mirrors L L. Said lay figures F' F' will of course be so placed as not to obstruct the entrances and exits to and from the stage.

The construction in detail: Having thus explained the general plan of my invention, I will now describe certain constructions in detail; but I do not limit myself to such constructions, my invention consisting in the application to scenic representations of a wall of mirrors which will reflect to the sight of the audience the representations and the audience itself.

The wall A is composed of numerous rectangular sections L L of heavy glass silvered on the back. A single plate or section of the wall of mirrors is represented in Figs. 13 and 14. These sections of glass L L are secured and supported on frames which in Figs. 5 and 6 are represented as constructed of vertical and horizontal bars or pieces D D, which are constructed of iron, and are secured at the corners of each rectangular section of framing by angle-irons and bolts, as represented by 3 3 in Fig. 6, and the several sections of framing may be further strengthened by diagonal braces 2 2. In Fig. 6 the roof-trees are similarly constructed of iron rods. The frame-work so constructed of numerous rectangular sections, each section the size of a plate L of the mirrors, is held upright by braces and the tie-rods 1 1 1, (see Fig. 4,) which tie the frame-work to the permanent wall E of the building. There will be as many of these tie-rods 1 1 1 as may be necessary to give requisite strength, and these tie-rods 1 1 1 will have their opposite ends fixed to the wall E and to the frame-work in any suitable manner, as by bolts and nuts. The plates of mirrors L L are secured to their several frames in any suitable manner.

Figs. 7 and 8 show the edges of the mirrors L L inserted into rabbets $d$ $d$ in the frames D D. The sheets of glass L may be secured in the sections of framing D D in the following manner: Three sides of the said section of framing are bolted together, forming three sides of a rectangle the size of a sheet of glass L. Strips of rather thick rubber $d^4$ are placed in the rabbets $d$ of frames D, and then the sheet of glass L is slid into the said frames D, the edges of the glass sliding in the rabbets $d$ and being protected from injury by the strips of rubber $d^4$. When the glass is pushed home, the fourth side of the frame-section, which also has a rabbet $d$ and strips $d^4$, as aforesaid, is bolted onto the other frames and the section is complete. When the sections are to be used, their frames are bolted together to form the wall of mirrors.

Other methods are illustrated in Figs. 15 to 20, and will be hereinafter described.

When constructed in the manner hereinbefore described, the ends of the frames D D and the joints between the said frames will be visible to the audience. The said frames and joints will be disguised and concealed by the tent-poles P P and other scenic objects in the manner hereinbefore described. When tight ropes R W are used to conceal the horizontal joints and frames, then the usual horses or supports r r will be erected immediately in front of the wall of mirrors to add to the illusion, (see Fig. 2,) and the inclined ends of the tight rope may also be represented as there shown. The end sections L² next to the wings will be hinged and put on rollers 7, so that said end sections L² can be turned back, as in Fig. 4, to permit of the entrance upon the stage of animals, troops, &c.

Fig. 21 shows a detail of one of the hinges, of which there will usually be two for each section L². D D' represent the frames of the stationary and of the movable parts, respectively, L L² being the mirror. The hinge is formed of heavy strap-irons 28, doubled and formed with the eye 35 for the hinge-pin 6. One of said strap-irons 28 is bolted to the angle-iron 29 of the frame D, and the other of said strap-irons 28 is bolted to the corresponding angle-iron 29 of frame D'. The leaves of the hinge, when closed, are concealed by the pole P, and, moreover, the said hinges, being back of the sides of the proscenium-arch, (see Fig. 1,) the motion of the end sections L² cannot be detected by the greater part of the audience, if by any part.

In Fig. 9 is shown a different construction of the framing. In this construction I rely entirely on the vertical standards D D and dispense with the horizontal frames. The standards D D will be supported and tied by rods 1 1 1 to the permanent wall in the manner hereinbefore described. Said standards D D are placed at proper intervals and have rabbets or grooves, as illustrated in Fig. 11, to receive and hold the opposite vertical edges of each sheet or plate of glass L. The plates of glass L are fitted into the grooves or rabbets at the top of the standards D D and gently lowered to place. As one row of plates L is so lowered another row is sent down (see Fig. 11) until it rests on the first row. The edges, as 11 11, of each plate of glass L are truly ground, so that when the wall is completed the joints between the glass plates L L will be imperceptible. With this construction, therefore, it is not necessary to use tight ropes or other scenic objects to conceal the horizontal joints. The vertical standards D D are concealed, as before, by poles P.

In Figs. 18, 19, and 20 are shown various methods of constructing the standards D D. In Fig. 18 the said standard consists of a beam 22, with broad flanges 21 21 on the front of the beam 22 to stiffen said beam 22. 19 is a strip with flanges 36 36. These strips 19 are screwed to the beams 22, the said flanges 36, together with the flanges 21, forming recesses for the edges of the plates of glass L L. The construction is made very clear by Fig. 18.

In Fig. 19 the standard D is composed of the beam 23, which has a flanged head, as shown, to engage on and hold the glass plates L L, and this beam 23 is stiffened by the side pieces 24 24, which are bolted on either side of the beam 23 by the bolt 25. The pieces 24 24 form the back ledges which support the glass plates L L. In Fig. 20 the standard D is stiffened by the angle-irons 26 26, which are bolted to either side of the beam 25 by the bolt 27. The beam 25 is formed with a flanged head, as shown, the flanges of the head and the angle-irons 26 26 together forming recesses which receive the edges of the glass plates L L.

Fig. 15 is a detail of a standard at the end of the wall of mirrors. The standard D consists of a beam 16, with flange on one side of the front end, as shown, and stiffened by the angle-iron 17, which is bolted to the beam 16 by the bolt 18. Said angle-iron 17, together with the flanged head of the beam 16, forms a recess to receive the edge of the glass plate L.

Figs. 16 and 17 are an elevation and section of a device for securing the glass to the frames. D is the frame or standard with flanged head 14. Said standard D has fixed upon it the yoke 15, which yoke 15 stands between the edges of the two adjoining plates of glass L. A block of wood 12 is placed on the backs of the two sheets of glass L L and secured by the wedge or key 13. The figures make the construction and arrangement entirely clear.

Having thus described my invention, I claim—

1. The combination, with a stage for scenic representations, of mirrors held in frames and reflecting toward the audience, and scenic objects arranged immediately in front of the joints of the frames and mirrors, so as to conceal said joints and frames, as and for the purpose described.

2. The combination, in theatrical constructions, of an auditorium, a stage at one end of the auditorium, and a reflecting-wall behind the stage, composed of a plurality of mirrors supported in vertical frames and reflecting toward the auditorium, as described.

3. The herein-described device for scenic representations, consisting of a wall of mirrors reflecting toward the audience, and end sections of said wall of mirrors hinged to turn in vertical planes, as and for the purpose described.

4. The combination, in scenic devices of a wall and stage, of mirrors reflecting toward the audience, and lay figures at the wings and so placed as to be reflected in the mirrors visibly to the audience, as and for the purpose described.

5. In scenic devices, a frame-work for mirrors, consisting of standards, stiffening-flanges on the sides of said standards, and flanged heads fixed or secured to the standards and engaging on the plates of mirror-glass, as described.

6. The herein-described device for securing plate-glass to frames, consisting of a yoke which is fixed on the frames and positioned at the ends of the plates of glass, a somewhat elastic back piece passed through the yoke, and a key securing said back piece in the yoke, as described.

In testimony that I claim the foregoing as my invention I have hereunto set my hand, at the city of New York, this 22d day of April, 1891.

CHARLES B. JEFFERSON.

In presence of—
D. WALTER BROWN,
LIONEL J. NOAH.